Figure 1:
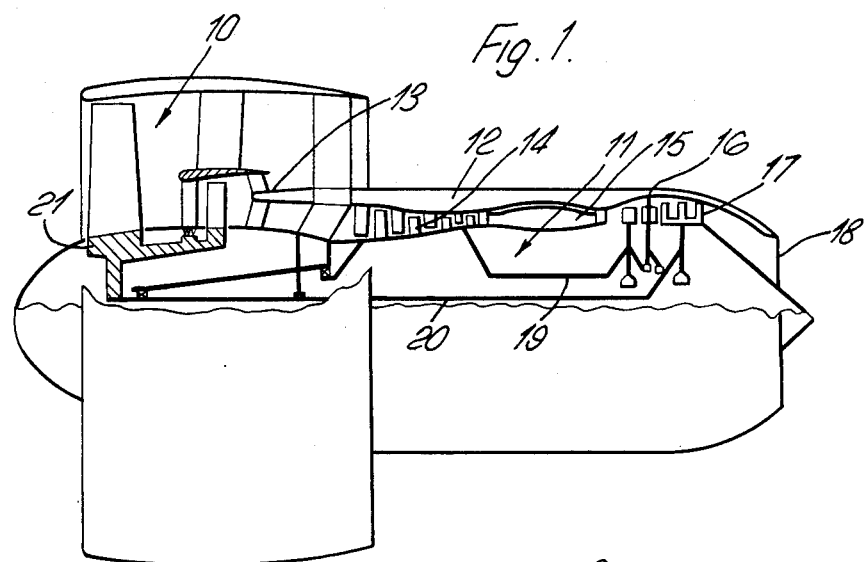

United States Patent [19]

Colley

[11] 4,055,042

[45] Oct. 25, 1977

[54] BYPASS GAS TURBINE FAN EMPLOYING A STUB ROTOR STAGE AND A MAIN ROTOR STAGE

[75] Inventor: Rowan Herbert Colley, Sunnyhill, England

[73] Assignee: Rolls-Royce Limited, London, England

[21] Appl. No.: 703,658

[22] Filed: July 8, 1976

[30] Foreign Application Priority Data

July 19, 1975 United Kingdom ............ 30350/75

[51] Int. Cl.² .................................................. F02K 3/06
[52] U.S. Cl. .................................... 60/226 R; 415/77
[58] Field of Search ............... 60/226 R, 226 A, 262, 60/224; 415/77–79

[56] References Cited

U.S. PATENT DOCUMENTS

| | | | |
|---|---|---|---|
| 2,923,125 | 2/1960 | Rainbow | 415/79 |
| 3,494,129 | 2/1970 | Krebs et al. | 60/226 R |
| 3,546,882 | 12/1970 | Berkey | 60/226 R |
| 3,879,941 | 4/1975 | Sargisson | 60/226 R |

Primary Examiner—Robert E. Garrett
Attorney, Agent, or Firm—Cushman, Darby & Cushman

[57] ABSTRACT

A gas turbine engine has a core engine which drives a fan, the fan comprising a main rotor stage and a stub rotor stage whose blades have a smaller radial extent than those of the main rotor stage. The main and stub stages of the fan both compress air to form a main fan airflow and a stub stage airflow respectively, the stub stage airflow being divided into two portions one of which rejoins the main fan airflow and one of which enters the core engine intake. In order to match the flow angles of the various flows, the stub stage has inner and outer outlet guide vanes which give different degrees of deflection to the two component portions of the stub stage airflow.

5 Claims, 3 Drawing Figures

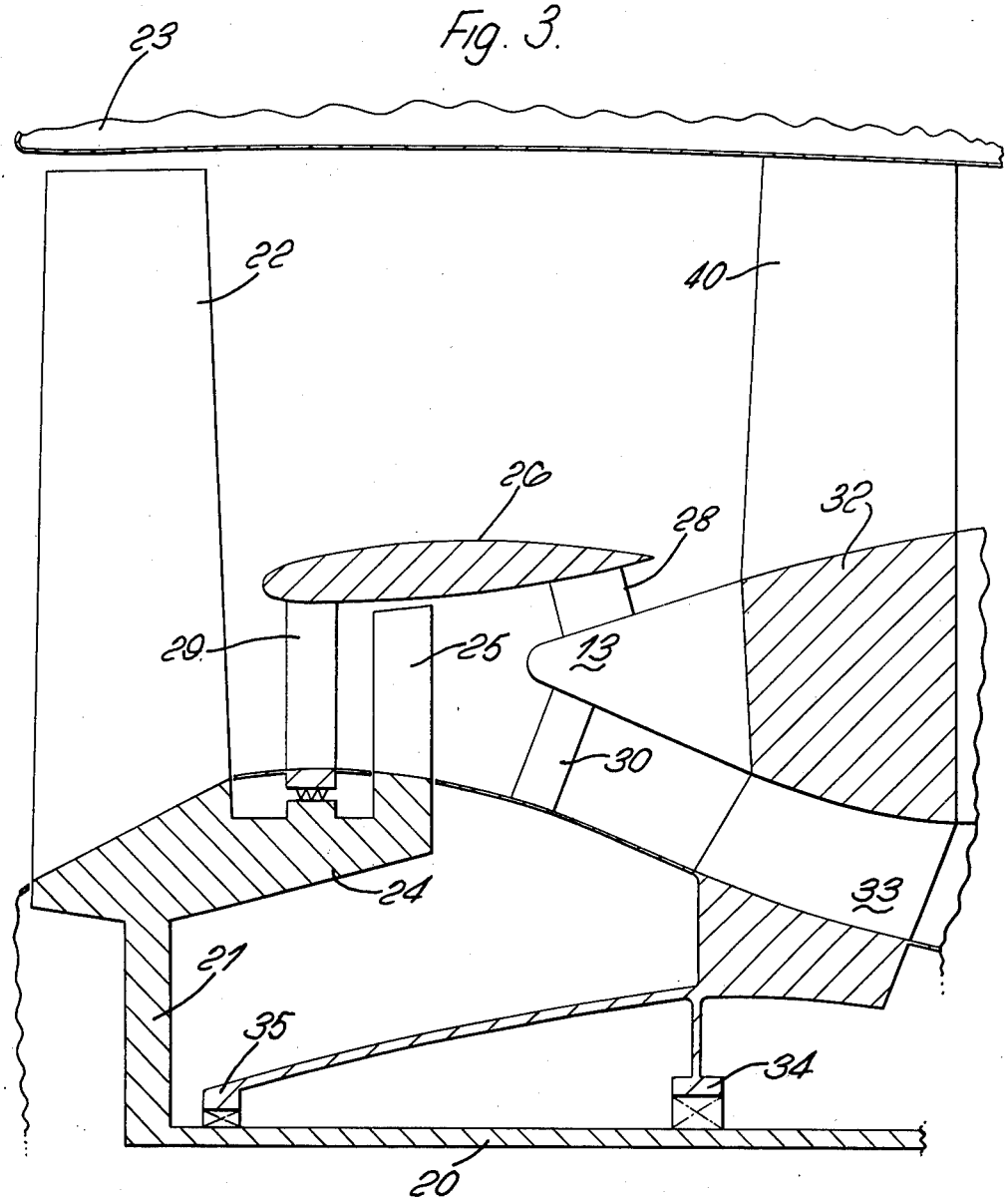

BYPASS GAS TURBINE FAN EMPLOYING A STUB ROTOR STAGE AND A MAIN ROTOR STAGE

This invention relates to a gas turbine engine, and particularly one of the fan type.

Such gas turbine engines normally comprise a 'core' engine which is a gas turbine engine acting mainly as a gas producer, and a fan, or low pressure ratio compressor driven by a fan turbine whose motive fluid is provided by the core engine. The fan compresses air of which part is fed to the intake of the core engine and part by-passes the core to exhaust through a propulsive nozzle and provide thrust.

It has been proposed to provide the fan with a 'stub' rotor stage, that is a rotor stage whose blades do not extend radially as far as do the other rotor stages of the fan. Such a stage may be mounted downstream of the main rotor stage or stages so that it affords extra pre-compression of the air destined to supply the intake of the core engine, which normally comprises the inner portion of the fan duct annulus. For various reasons it is preferable that the core engine compressor is not constrained to take the entire output of the stub stage, but that it is allowed to take a varying proportion; consequently the stub stage output is divided into two streams, one feeding the core engine and one passing outside the core engine to rejoin the main fan flow.

However, such a construction introduces difficulties in the matching of the whirl in the main fan airflow and the stub stage airflow rejoining the main fan flow, and providing the necessary degree of whirl for the core engine compressor. The present invention provides a construction in which the various parameters may be adjusted in a convenient way.

According to the present invention a gas turbine engine comprises a core engine and a fan, the fan including at least one main rotor stage and a stub rotor stage downstream of the main stage, the blades of the stub stage having a smaller radial extent than that of the blades of the main stage, the stub stage being adapted to compress air, part of which flows into the intake of the core engine and part of which rejoins the main fan air flow, and inner and outer stub stage outlet guide vanes adapted to give different degrees of deflection to the air compressed by the stub stage and entering respectively the core engine intake and the main fan air flow.

In a preferred embodiment the fan includes a fan cowl which defines the boundary of the fan stream and a first splitter is provided which defines the boundary of the flow passing through the stub stage. In this case it is convenient if the outer stub stage outlet guide vanes interconnect the first splitter and the second splitter which forms the casing of the core engine intake.

It may prove necessary to provide additional support for said splitter, and this may conveniently comprise outlet guide vanes for the main fan stream which interconnect the splitter and the fan cowl.

Figure 2:
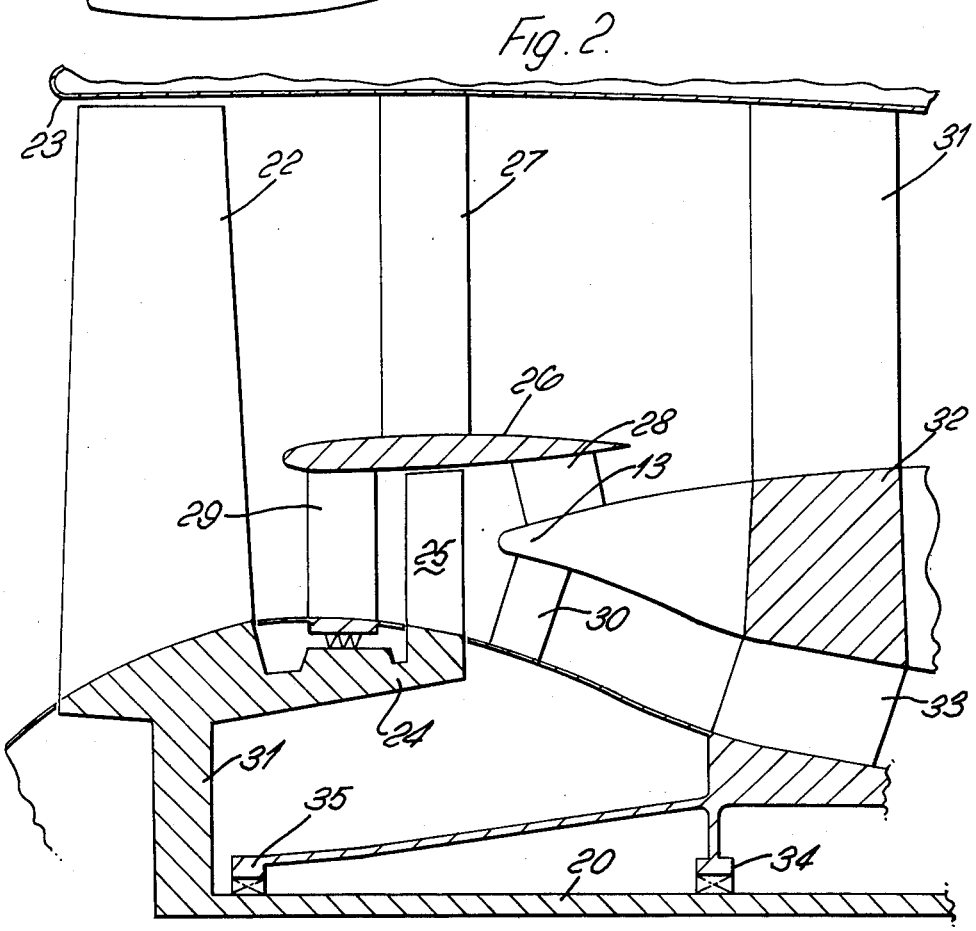

The invention will now be particularly described, merely by way of example with reference to the accompanying drawings in which FIG. 1 is a partly sectioned side view of a gas turbine engine in accordance with the invention, FIG. 2 is an enlarged section through the fan of the engine of FIG. 1, and FIG. 3 is a view similar to FIG. 2 but of a further embodiment.

Referring first to FIG. 1, a gas turbine engine comprises a fan 10 and a core engine 11. The core engine comprises a casing 12, whose forward extremity forms an intake 13, and within which are mounted in flow series a compressor 14, a combustion chamber 15, a core engine turbine 16 and a fan turbine 17. The downstream end of the casing 12 forms a propulsion nozzle 18. The compressor 14 and turbine 16 are drivingly interconnected by a shaft 19.

The fan turbine 17 drives a shaft 20 which extends forward coaxial with the shaft 19 to drive the rotor disc 21 of the fan. The detailed construction of the fan may be more easily seen in FIG. 2 and it will be seen that the fan disc 21 supports at its periphery an annular array or stage of rotor blades 22 which extend from the disc into close proximity with the fan cowl 23, these blades comprising the main fan rotor stage. An extension 24 downstream of the disc 21 supports the stage of stub rotor blades 25. These blades do not extend completely across to the fan cowl 23 but as can be seen they extend approximately a third of the way across the duct into close proximity with a splitter 26. This splitter is supported from the cowl 23 by main fan outlet guide vanes 27 and is provided with additional support by stub fan outer outlet guide vanes 28 which are supported from the intake 13 of the core engine. The splitter is also used to carry stub fan inlet guide vanes 29 which extend across the complete flow passage of the stub fan. The stub fan is also provided with inner outlet guide vanes 30 which extend across the inlet passage to the core engine.

The supporting structure for the fan rotor will be seen to include struts 31 which extend from the fan cowl to an annular supporting structure 32 within the casing 12 of the core engine. From the ring 32 extend further struts 33 which serve to support the two bearings 34 and 35 which carry the fan shaft 20.

Operation of this embodiment is as follows: The main fan rotor stage 22 rotates and compresses the airflow between the fan hub and the cowl 23 and at the splitter 26 this flow of air is divided into an outer and an inner flow. The outer flow passes through outlet guide vanes 27 where the majority of its whirl is removed, and it is then enabled to pass through struts 31 which do not have to carry out any net deflection of the airflow and can therefore be straightforward streamlined supporting members.

The inner flow passes through the vanes 29 where once again the majority of the whirl is removed and then through the stub rotor stage 25 where additional compression is given to the air. It will be appreciated that this stub stage provides a dual advantage in that it makes up for the relatively inefficient operation of the main fan 22 in the region of low linear speed adjacent to the hub, and it also provides some additional pre-compression of the air which is destined to feed the core engine. The air which is thus further compressed is again split by the intake 13 into an outer flow which passes through the vanes 28 to rejoin the main fan stream and an inner flow which passes through the vanes 30 into the core engine. This splitting of the outlet air from the stub stage provides the advantage that the core engine is not forced to take the complete flow of the stub stage at all times, but is to some extent allowed to demand a suitable proportion of this air, with the remainder passing through the vanes 28; it therefore operates as an automatic bleed valve. There is also a tendency for any foreign objects entering the engine to be deflected away from the core engine intake between the vanes 28, thus reducing the chance of damage to the core engine.

However, in previous proposals a problem has arisen in matching the whirls of the three streams of air involved. In the present invention the whirl which is imparted to the stub fan stream by the blades 25 may be deflected differently by the vanes 28 and 30. In the present instance the vanes 28 are arranged to deflect the air sufficiently to remove residual whirl from the outer stream, so that the complete main fan stream passing through the struts 31 is provided with zero whirl. The vanes 30 are arranged to deflect the air sufficiently to provide a suitable degree of whirl (which may for instance be some 30°) to be acceptable to the compressor 14 of the core engine. It will be also seen that the splitter 26 is very well supported directly from the fan cowl by the OGV's 27 and from the ring 32 by way of the intake 13 and vanes 28.

The embodiment of FIG. 3 is very similar in basic details to that of FIG. 2; thus the fan again comprises a shaft 20, disc 21, main rotors 22, casing 23, extension 24 and stub rotor blades 25. A splitter 26 is again provided with guide vanes 28,29 and 30 but in this case the main fan outlet guide vanes 27 previously depicted are omitted. The support structure once more includes the ring 32, struts 33 and bearings 34 and 35, but in this case it is necessary to support the ring 32 from the casing 23 by way of vanes 40 which are not simple streamlined struts but are used to have the aerodynamic effect which was performed in the previous embodiment by the vanes 27.

It will be seen that operation of this embodimebt differs in that the main fan whirl is still present just upstream of the vanes 40 and therefore the vanes 28 are used to match the stub fan stream whirl to this same value. The operation of the inner stub fan stream will be exactly similar to that of FIG. 2.

It will also be noted that the splitter 26 does not in this case have the double support from the vane 27 and the vane 28, and it may therefore be necessary to provide strengthening of the intake 13 and the vanes 28.

It should be understood that a number of modifications may be made to the embodiments described above. Thus although it would be normal to use cowled fans and stub fans of the type described, it would be possible to use uncowled fans with the consequent degree of mixing of the various streams. It should also be noted that the single stages of vanes 28 and 30 can be replaced by double rows or other equivalents, and of course the details of the core engine described above could be modified in a variety of ways, for instance by using a multi-shaft layout and/or variable vanes.

I claim:

1. A gas turbine engine comprising a core engine having an intake and having compressor means, combustion chamber and turbine means in flow series;

a fan upstream of said intake of said core engine and operatively driven by said core engine, said fan including at least one annular array of rotor blades defining a main rotor stage and a further annular array of rotor blades downstream of said main rotor stage and defining a stub rotor stage, said further annular array of rotor blades of said stub rotor stage having a smaller radial extent than said at least one annular array of rotor blades of said main rotor stage, said main rotor stage and said stub rotor stage each being adapted to compress air to form a main fan airflow and a stub stage airflow respectively;

a first splitter ring extending around said stub rotor stage and defining an outer boundary of said stub stage airflow, said first splitter ring being arranged to divi-e said main airflow of said main rotor stage into a first portion passing about the exterior of the same and a second portion passing through said stub stage rotor;

a second splitter ring defined by an upstream end of said intake of said core engine, said second splitter ring being arranged to divide said stub stage airflow into a first portion which enters said core engine through said intake and a second portion which joins said first portion of said main fan airflow; and inner and outer stub stage outlet guide vanes extending respectively inwardly from said second splitter ring and outwardly of said second splitter ring to said first splitter ring, said inner and outer stub stage outlet guide vanes being adapted to give different degrees of deflection to said first and second portions of stub stage airflow respectively.

2. A gas turbine engine as claimed in Claim 1 including a row of fan outlet guide vanes, each of said vanes extending outwardly from said first splitter ring across said first portion of said main fan airflow.

3. A gas turbine engine as claimed in claim 2 including an annular fan cowl surrounding said main rotor stage, said annular fan cowl forming an outer boundary of said main fan airflow, said fan outlet guide vanes being joined to said fan cowl at their outer extremities.

4. A gas turbine engine as claimed in claim 3 including support structure for said core engine, and a row of struts extending from said annular fan cowl to said second splitter ring, said row of struts forming part of said support structure of said core engine.

5. A gas turbine engine as claimed in claim 1 including an annular fan cowl surrounding said main rotor stage and forming an outer boundary of said main fan airflow, support structure for said core engine, and a row of struts extending from said annular fan cowl to said splitter ring, said row of struts forming part of said support structure of said core engine.

* * * * *

UNITED STATES PATENT OFFICE
CERTIFICATE OF CORRECTION

Patent No. 4,055,042    Dated October 25, 1977

Inventor(s) Rowan H. Colley

It is certified that error appears in the above-identified patent and that said Letters Patent are hereby corrected as shown below:

In claim 1 of the patent at column 4, line 19, correct the spelling of "divide".

Signed and Sealed this

Fourth Day of July 1978

[SEAL]

Attest:

RUTH C. MASON
Attesting Officer

DONALD W. BANNER
Commissioner of Patents and Trademarks